United States Patent [19]
Miyamori et al.

[11] Patent Number: 5,677,752
[45] Date of Patent: Oct. 14, 1997

[54] DIGITAL SOUND RECORDING ON MOTION PICTURE FILM

[75] Inventors: Shinji Miyamori; Masatoshi Ueno, both of Tokyo; Matayasu Kubo, Kanagawa; Kenji Takanashi, Kanagawa; Toshiaki Setogawa, Kanagawa, all of Japan; Michael J. Kohut; Jeffrey E. Taylor, both of Culver City, Calif.

[73] Assignees: Sony Corporation, Tokyo, Japan; Sony Cinema Products Corporation, Culver City, Calif.

[21] Appl. No.: 755,960

[22] Filed: Nov. 25, 1996

Related U.S. Application Data

[62] Division of Ser. No. 352,022, Nov. 30, 1994, Pat. No. 5,617,158.

[30] Foreign Application Priority Data

| Dec. 7, 1993 | [JP] | Japan | 5-306895 |
| Dec. 7, 1993 | [JP] | Japan | 5-306896 |
| Jan. 25, 1994 | [JP] | Japan | 6-006673 |

[51] Int. Cl.⁶ ............................................. G03B 31/02
[52] U.S. Cl. ............................ 352/5; 352/11; 352/27; 352/37
[58] Field of Search ..................... 352/1, 5, 8, 11, 352/12, 26, 27, 29, 37; 360/3, 32, 48, 53; 369/14, 126; 386/100, 104

[56] References Cited

U.S. PATENT DOCUMENTS

| 4,306,781 | 12/1981 | Mosely | 352/37 |
| 4,461,552 | 7/1984 | Levine | 352/27 |
| 4,506,306 | 3/1985 | Veillard | 360/47 |
| 4,600,280 | 7/1986 | Clark | 352/37 |
| 4,772,963 | 9/1988 | Lahr et al. | 360/47 |
| 5,155,510 | 10/1992 | Beard | 352/27 |
| 5,184,229 | 2/1993 | Saito et al. | 358/427 |
| 5,231,487 | 7/1993 | Hurley et al. | 358/133 |
| 5,453,802 | 9/1995 | Kohut et al. | 352/27 |
| 5,471,263 | 11/1995 | Odaka | 352/27 |
| 5,550,603 | 8/1996 | Yoshimura et al. | 352/27 |

FOREIGN PATENT DOCUMENTS

| 0544090 | 6/1993 | European Pat. Off. . |
| 2512973 | 3/1983 | France . |

*Primary Examiner*—A. A. Mathews
*Attorney, Agent, or Firm*—William S. Frommer; Alvin Sinderbrand

[57] ABSTRACT

A motion picture film capable of reproducing the sound field full of ambience in the reproducing system. The digital sound tracks 5L and 5R, on which digital audio data have been recorded, are recorded so that temporally same digital audio signals are recorded with a spatial shift by a preset distance along the film running direction.

13 Claims, 14 Drawing Sheets

| | |
|---|---|
| . | . |
| Cn | Cn-α |
| Ln | Rn-α |
| CLn | CRn-α |
| SLn | SRn-α |
| SWn | SWn-α |
| RMn | LMn-α |
| ⋮ | ⋮ |
| RMn+α-1 | LMn-1 |
| Cn+α | Cn |
| Ln+α | Rn |
| CLn+α | CRn |
| SLn+α | SRn |
| SWn+α | SWn |
| RMn+α | LMn |
| Cn+α+1 | Cn+1 |
| ⋮ | ⋮ |
| Cn+2α | Cn+α |
| Ln+2α | Rn+α |
| CLn+2α | CRn+α |
| SLn+2α | SRn+α |
| SWn+2α | SWn+α |
| RMn+2α | LMn+α |
| . | . |

UNCORRECTABLE (bracket spanning Cn+α to RMn+α on left column)

FIG.5

DIGITAL SOUND RECORDING ON MOTION PICTURE FILM

This application is a division of application Ser. No. 08/352,022, filed Nov. 30, 1994, now U.S. Pat. No. 5,617,158.

BACKGROUND OF THE INVENTION

1. Field of the Invention

This invention relates to recording and reproducing a digital pattern as a sound track for a motion picture film, and the motion picture film with the digital pattern recorded thereon.

2. Background

In a conventional motion picture film such as shown in FIG. 16, the recording format has a large number of picture-recording areas (frames) 201 arranged in its longitudinal direction, that is along the direction of film travel (the film running direction). Audio signals related to the pictures recorded in the picture recording areas are recorded in the analog sound track areas 202 along side the picture-recording areas in the film running direction. This arrangement is prescribed in SMPTE standards. In the analog sound tracks, audio signals temporally coincident with the picture recorded in the picture recording areas (frames) are recorded at a position 20.5 frames ahead of the picture. This is done to account for the fact that the audio tracks are read by a playback assembly which is located between the projection assembly and the projector's take-up reel (20.5 frames ahead of the projected frame. During playback, the picture and associated audio are thus played back simultaneously.

In this conventional motion picture film, left and right channel audio signals are recorded with temporal correlation. As shown in FIG. 16, the audio signals are recorded in the analog sound track 202 at a position 20.5 frames ahead of the corresponding picture frame so that the audio signals can be temporally coincident with the picture recorded in the picture recording areas 201. However, a problem can occur if data are lost at the junction of hand-cut editing or due to scratches running vertically with respect to the film running direction, the playback capability of left and right channel audio signals is lost and therefore, sound interruption can occur. In other words, when a hand-cut edit is performed as a basic technique for film editing or repair, it may occur that audio signals are still left on the analog sound track 202 though a corresponding frame picture 201 has been already removed by editing, or that audio signals are cut out by editing though a corresponding frame picture still exists on the film.

Attempts have been made to provide areas for digital audio data in un-used areas of the standard format, in order to produce audio playback output during projection with sufficient ambience, while the current format is observed. The assignee of the present invention has already proposed a technique of providing two sound tracks in the film running direction on both sides of the picture recording areas for recording the motion pictures and digitally recording audio signals in these digital sound tracks for assuring sound reproduction with sufficient ambience. This technique is disclosed as a Japanese Laid-Open Patent Application Hei 5-40938 and a Japanese Laid-Open Patent Application Hei 5-109196 which was filed as a U.S. patent application Ser. No. 958,664 (abandoned) and its continuation application Ser. No. 090,705 and also another Japanese Patent Application Hei 4-320918 which was filed as a U.S. patent application Ser. No. 158,767, now U.S. Pat. No. 5,550,603. These applications are hereby incorporated by reference.

In such motion picture film, it is desirable to provide sound reproduction during projection with high sound quality and sufficient ambience, such that error correction or error concealment has to be performed on playback data reproduced from the digital sound tracks.

With conventional media, such as a digital equipment for a CD, cross-interleaved Reed-Solomon code is employed for error correction as protection against random errors or burst errors. The extent of such error correction capability required is set depending on the errors produced in the media.

The areas on the motion picture film for optical digital recording of audio signals are easily damaged by the film driving system. As the film is repeatedly reproduced a large number of times, a relatively long burst error can occur. Consequently, an interleaving length has to be set to be longer in order to eliminate sound interruption. However, when the interleaving length becomes longer, it causes phase offset between the picture on the film and its corresponding audio signal. This generates a limitation on a hand-cut editing which is a basic technique for film editing. Consequently, limitations are imposed on employing a longer interleaving length as a system.

SUMMARY OF THE INVENTION

It is an object of the present invention to provide a motion picture film, recording method and apparatus and/or reproducing method and apparatus in which there is minimal risk of the audio signal playback capability in the playback system being lost by scratches extending in a direction perpendicular to the film running direction or at the film junction.

It is another object of the present invention to provide a motion picture film, recording method and apparatus and/or reproducing method and apparatus in which sound interruption may be compensated in the playback system even if the signal recording area on one longitudinal side of the film cannot be reproduced by long burst errors.

It is a further object of the present invention to provide a motion picture film, recording method and apparatus and/or reproducing method and apparatus in which audio signals of good sound quality may be positively reproduced by digital processing in the playback system.

In one aspect of the present invention, a motion picture film is provided having at least left-channel and right-channel digital sound tracks extending along a film running direction, and left-channel and right-channel audio data optically recorded on the sound tracks. The motion picture film includes the audio data of the temporally same left and right channel audio signals respectively recorded on the left-channel and right-channel digital sound tracks with a spatial shift of a pre-set distance along the film running direction.

In another aspect of the present invention, a motion picture film is provided having a picture recording area in which a picture is recorded frame-by-frame, at least left-channel and right-channel digital sound tracks extending along a film running direction, and left-channel and right-channel audio data optically recorded on the sound tracks. The motion picture film includes temporally coincident pictures and audio data recorded along the film running direction at approximately coincident physical positions in at least one of the two digital sound tracks and the picture recording area.

In accordance with the present invention, the temporally same left and right channel audio signals are held on left-channel and right-channel sound tracks with a spatial shift of a pre-set distance along the film running direction. Thus, it becomes possible to compensate for sound interruption caused by simultaneous destruction of the audio data of the left and right channels by scratches extending normal to the film running direction or at the film junction in the reproducing system, and hence to prevent loss of the reproducability of the reproducing system to enable positive reproduction of audio data. Also it becomes possible to compensate for sound interruption even if the recording area of audio data of one of the channels is destroyed by long burst error and becomes unreproductable.

These and other objects, advantages and features of the invention will become apparent to those skilled in the art upon consideration of the following description of the invention.

DETAILED DESCRIPTION OF DRAWINGS

FIG. 5 is a schematic plan view showing an embodiment of a motion picture film in which audio data has become uncorrectable.

DETAILED DESCRIPTION OF THE PREFERRED EMBODIMENT

Figure 1:
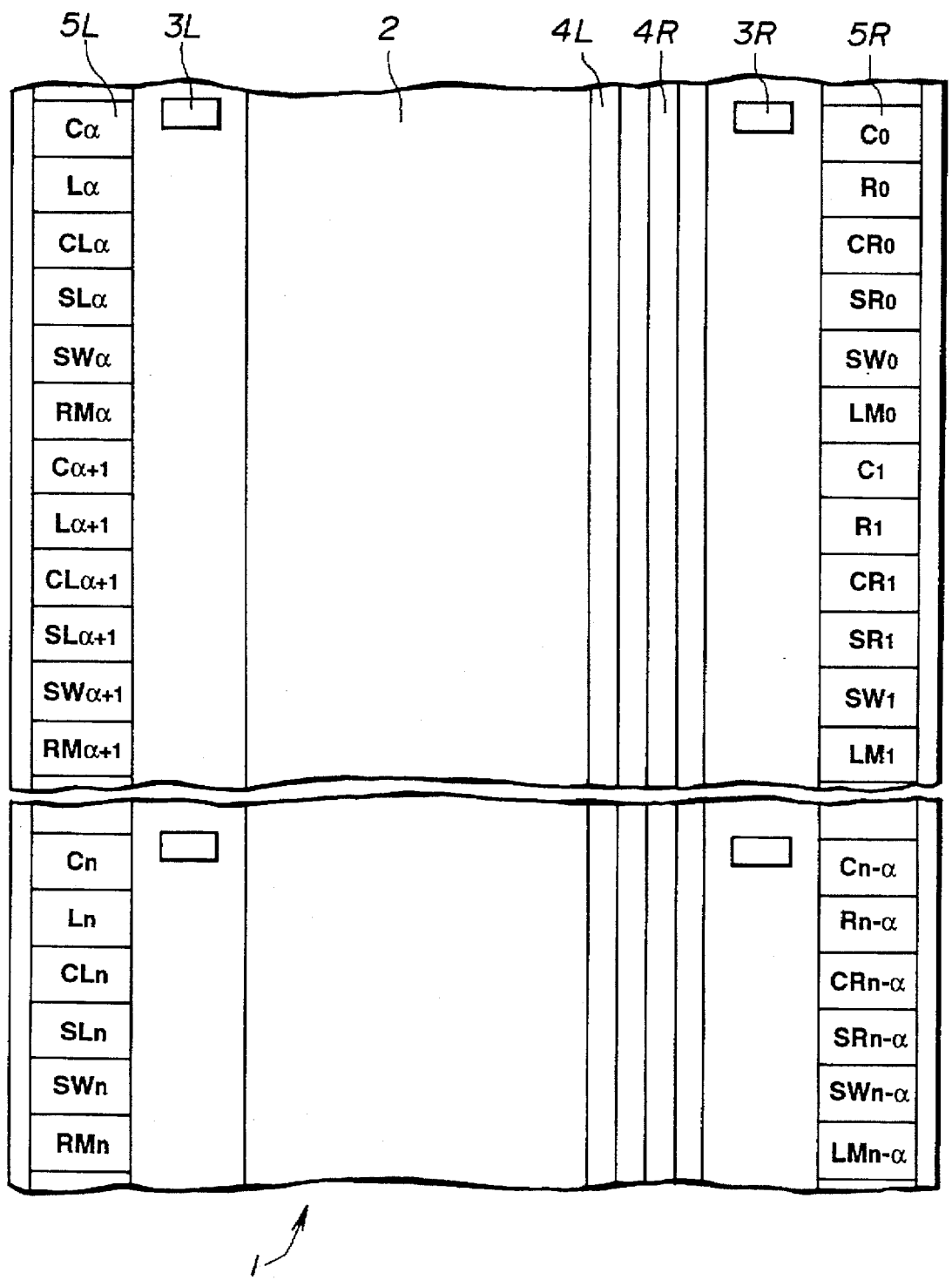
FIG. 1 is a schematic plan view showing a motion picture film according to the present invention.

The motion picture film, the method and apparatus for recording and the apparatus for reproducing it will be explained by referring to the drawings. This application claims priority of Japanese patent applications number 93065224, 93087404 and 93090967 and is related to Japanese patent application number 93090956. Each of these applications is hereby incorporated by reference.

The motion picture film according to the present invention is configured as shown for example in FIG. 1. The motion picture film 1, shown in FIG. 1, has a picture recording area 2 for recording a picture to be projected, a perforation area 3L and a perforation area 3R for transporting the motion picture film for projection, an analog sound track 4L and an analog sound track 4R for enabling audio signals to be reproduced with a conventional equipment, and a digital sound track 5L and a digital sound track 5R for recording multi-channel digital audio data.

Left and right channel analog audio signals are recorded on the analog sound tracks 4L and 4R, respectively.

On the digital sound track 5L and digital sound track 5R of the preferred embodiment, there are recorded 8-channel audio data Cn, SWn, Ln, Rn, CLn, CRn, SLn and SRn, for a center channel (C), a sub-woofer channel (SW), a left channel (L), a right channel (R), a center left channel (CL), a center right channel (CR), a surround left channel (SL) and a surround right channel (SR), audio data LMn, which is a mixture of the left channel (L), center left channel (CL) and the surround left channel (SL), and audio data RMn which is a mixture of the right channel (R), center right channel (CR) and the surround right channel (SR). In the digital sound track 5L, there are sequentially recorded audio data Cn, Ln, CLn, SLn, SWn and RWn, whereas, in the other digital sound track 5R, there are sequentially recorded audio data Cn-α, Rn-α, CRn-α, SRn-α, SWn-α and LMn-α.

It is noted that suffixes "n" or "n-α" indicate the order in the time sequence. For example, Cn of the digital sound track 5L indicates that the audio data is the in the nth position in the time sequence of the center channel (C), while Cn-α of the digital sound track 5R indicates that the audio data is in the (n-α)th position in the time sequence of the center channel (C). That is, data lagging by α with respect to data recorded on the digital sound track 5L is recorded on the digital sound track 5R.

For purposes of this document, each of the left and right channels is associated with a center and a surround channel. For example, the left channel is associated with a left surround and a left center channel. These associated center and surround channels (and similar channels) provide the listener with sound having enhanced ambience and are thus referred to generically as "ambient channels" and similar terminology herein.

Figure 2:
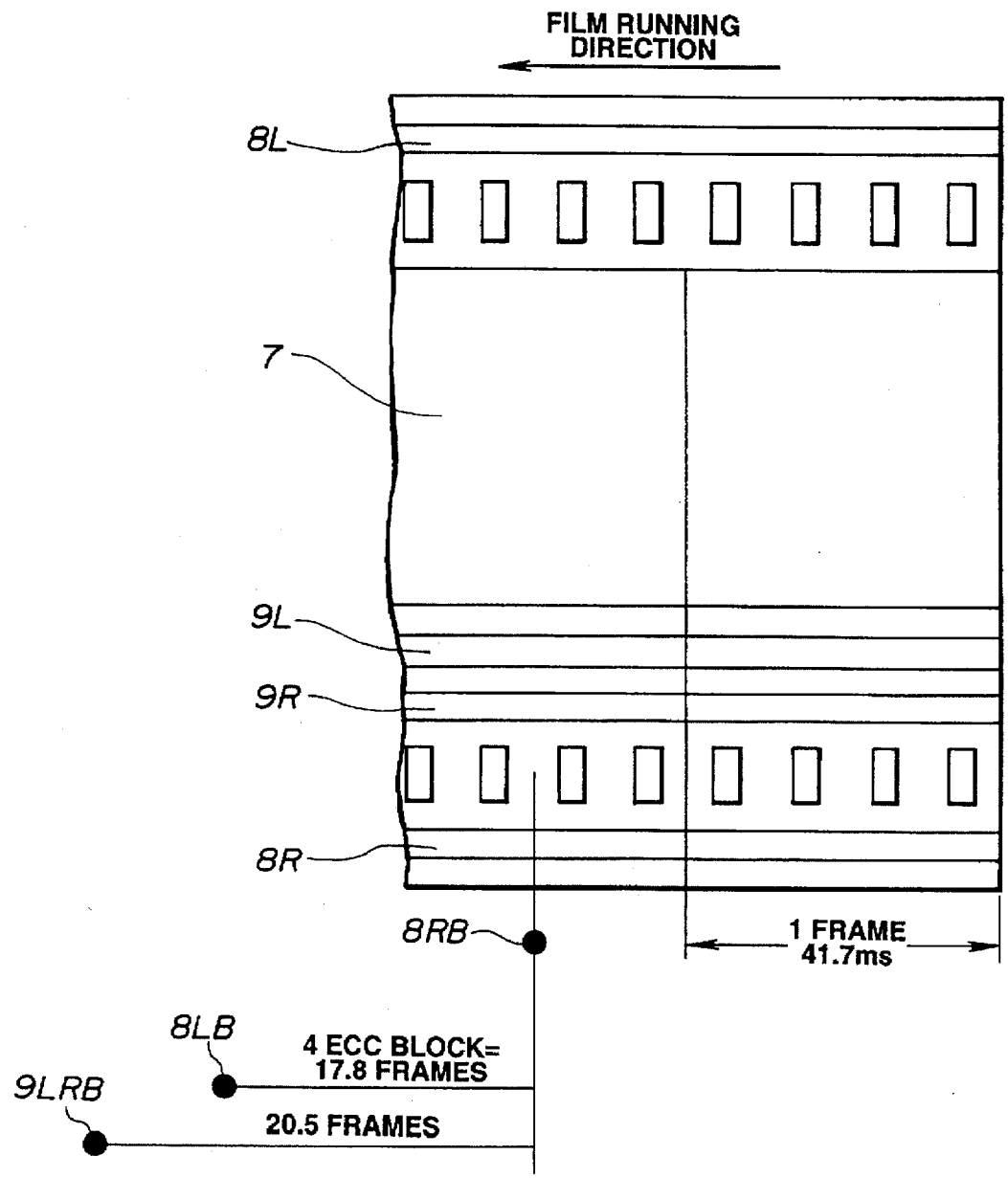
FIG. 2 is a schematic plan view showing a motion picture film for illustrating the recording position of audio signals in the motion picture film according to the present invention.

Referring to FIG. 2, the audio data having the same timing as the audio data recorded at a reference point 8RB on a digital sound track 8R at a center of a frame 7 of a motion picture film is recorded at a position 8LB ahead by 4 ECC blocks (=17.8 frames). That is, the audio data at the position 8LB on the digital sound track 8L is reproduced earlier than the audio data at the position 8RB on the digital sound track 8R. The position on the analog sound track in which the same timing audio data is recorded is 9LRB which is 20.5 frames ahead of the reference point 8RB.

Figure 3:
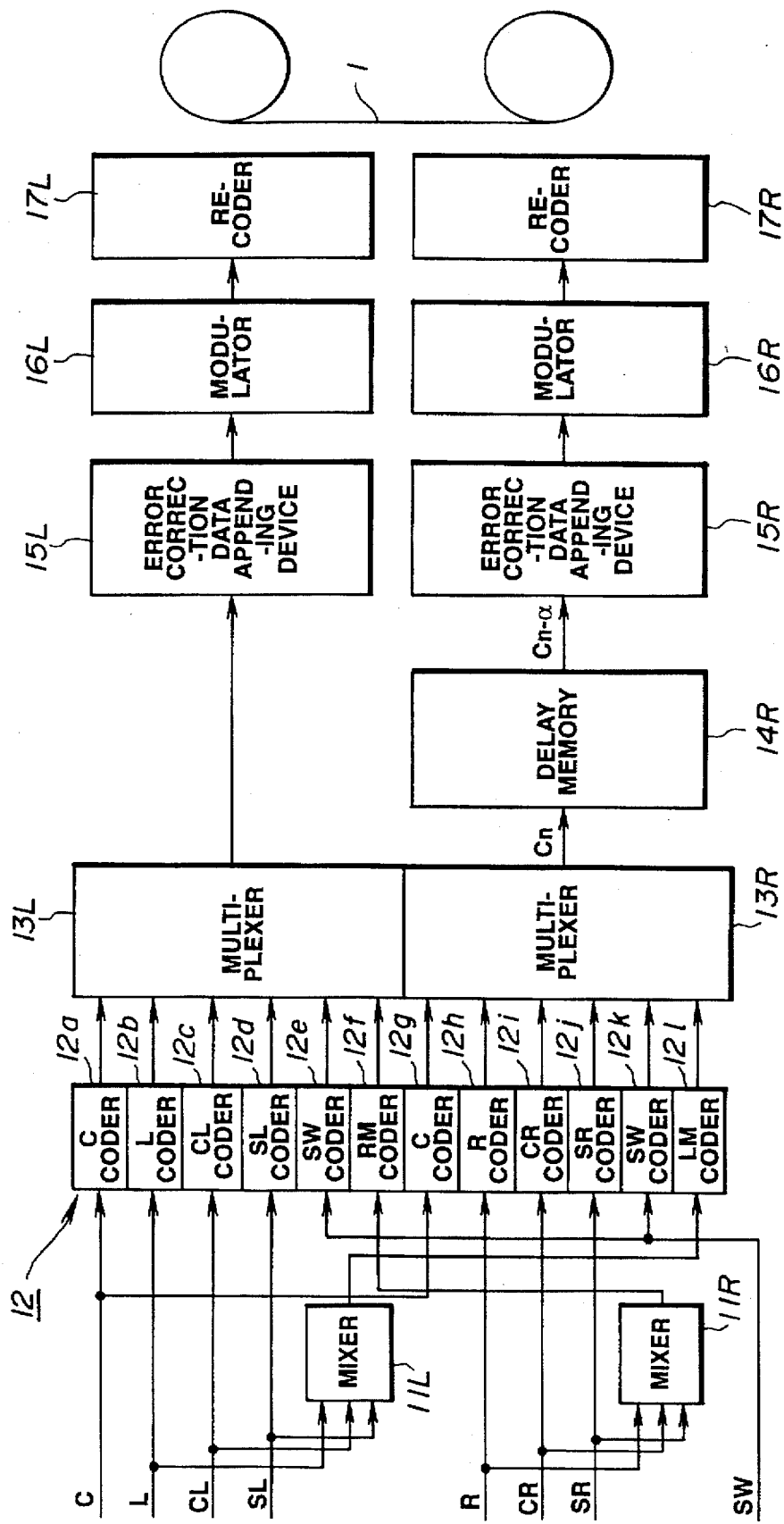
FIG. 3 is a block diagram showing an embodiment of a recording apparatus of a motion picture film according to the present invention.

The recording apparatus for the motion picture film according to the embodiment of the invention is configured as shown in FIG. 3. The recording apparatus shown in FIG. 3, recording left-channel and right-channel audio data on the digital sound tracks 8L, 8R of the above-described motion picture film 1, is made up of mixers 11L, 11R, coders 12a to 12l, multiplexers 13L, 13R, a delay memory 14R, error correction data appending devices 15L, 15R, modulators 16L, 16R and recorders 17L, 17R.

In the present recording apparatus, the center channel (C) is connected to the coders 12a and 12g, and the left channel (L) is connected to the coder 12b and the mixer 11L. The center left channel (CL) is connected to the coder 12c and the mixer 11L, and the surround left channel (SL) is connected to the coder 12d and the mixer 11L, the output of which is connected to the coder 12l. The right channel (R) is connected to the coder 12h and the mixer 11R, and the center right channel (CR) is connected to the coder 12i and the mixer 11R. The surround right channel (SR) is connected to the coder 12j and the mixer 11R, the output of which in turn is connected to the coder 12f. The sub-woofer channel (SW) is connected to the coders 12e and 12k.

The coders 12a to 12f are connected to the multiplexer 13L, and the coders 12g to 12l are connected to the multiplexer 13R. The multiplexer 13L is connected via the error appending device 15L and the modulator 16L to the recorder 17L. On the other hand, the multiplexer 13R is connected via the delay memory 14R to the error correction data appending device 15R and thence to the recorder 17R via the modulator 16R.

Input audio signals to the center channel (C) are fed to the coders 12a and 12g. Input digital audio signals to the left channel (L) are fed to the mixer 11L and the coder 12b, and input digital audio signals to the center left channel (CL) are fed to the mixer 11L and the coder 12c. Input digital audio signals to the surround left channel (SL) are fed to the mixer 11L and the coder 12d, while the signals fed to the mixer 11L are mixed together as a mixed signal LM which is fed to the coder 12l as the compensation data of audio data of the respective channels. Input digital audio signals to the right channel (R) are fed to the mixer 11R and the coder 12h, and input digital audio signals to the center right channel (CR) are fed to the mixer 11R and the coder 12i. Input audio signals of the surround right channel (SR) are fed to the mixer 11R and the coder 12j, while the signals fed to the mixer 11R are mixed together to form a signal RM which is fed to the coder 12f as the compensating data of the audio data of the respective channels.

Input digital audio signals to the sub-woofer channel (SW) are fed to the coders 12e and 12k.

The digital audio signals C, L, CL, SL, SW and RM, which are fed to the coders 12a to 12f, as left route signals, and the digital audio signals C, R, CR, SR, SW and LM, fed to the coders 12g to 12l, as right route signals, are therein processed using data compression and high efficiency coding, in order to reduce the quantity of data to one-fifth. Such data compression and coding is preferably achieved through the combination of sub-band coding, orthogonal transform coding, and bit allocation.

The compressed left route signals are fed to the multiplexer 13L, while the compressed right route signals are fed to the multiplexer 13R. The signals thus fed are converted by the multiplexers 13L and 13R into output bitstreams for recording. The left route output bitstream from the multiplexer 13L is fed to the error correction data appending device 15L, while the right route output bitstream from the multiplexer 13R is fed to the delay memory 14R. Time difference is appended by the delay memory 14R to the right route bitstream so that the right route bitstream will be recorded with a time lag with respect to the left route bitstream. The right route bitstream is then fed to the error correction data appending device 15R.

The data fed to the error correction data appending devices 15L, 15R are respectively added to by C2 parity error correction signals and C1 parity error correction signals, each employing the cross-interleave Reed-Solomon code, and thence fed to the modulators 16L, 16R.

The data fed to the modulators 16L, 16R are converted by 8–9 conversion so that 1-byte data is converted into 9-dot pattern data, with a data volume consisting of a pre-set number of bytes as a block. The converted data are recorded block-by-block on the digital sound tracks 5L and 5R (FIG. 1) by the recorders 17L, 17R.

With the motion picture film 1, on which audio data of respective channels are recorded by the present recording apparatus, audio data RMn, mixed from right channel (R), center right channel (CR) and the surround right channel (SR), digitized from the right route analog audio signals, are recorded as right- route compensation data. On the other hand, audio data LMn, mixed from left channel (L), center left channel (CL) and the surround left channel (SL), digitized from the left route analog audio signals, are recorded as left-route compensation data. Thus, compensation channels are formed by mixing a left or right stereo channel with its associated ambience channels. In addition, audio data of the respective channels, recorded on the digital surround track 5R, are recorded with a time difference with respect to the audio data of respective channels recorded on the digital sound track 5L.

Figure 4:
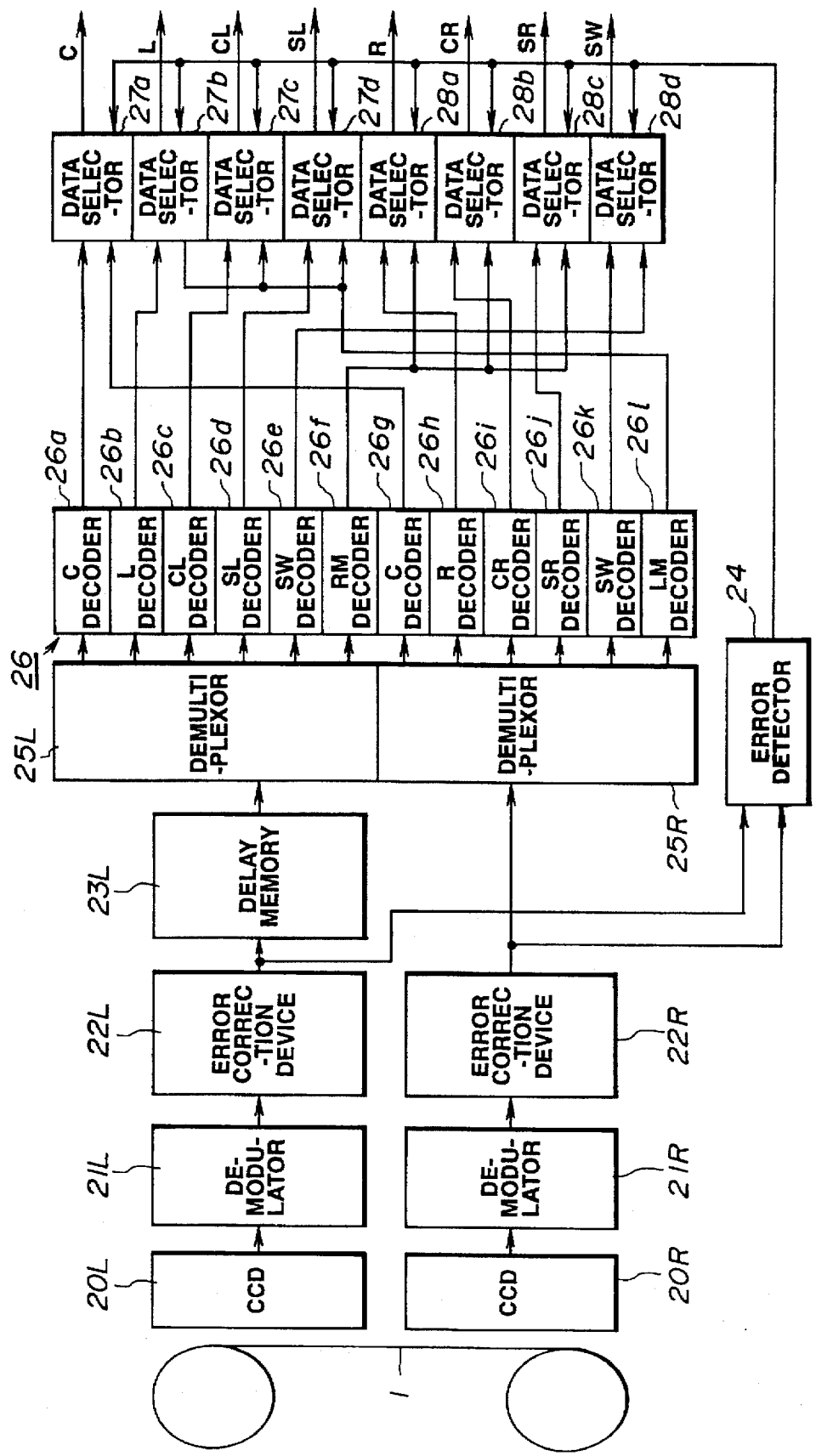
FIG. 4 is a block diagram showing an embodiment of a reproducing apparatus for a motion picture film according to the present invention.

The reproducing apparatus for the motion picture film according to the present invention is configured as shown for example in FIG. 4. The reproducing apparatus shown in FIG. 4 is adapted for reproducing the left channel and right channel audio data from the digital sound tracks 8L, 8R of the above-described motion picture film 1, and is made up of CCD line sensors 20L, 20R, demodulators 21L, 21R, error correction devices 22L, 22R, a delay memory 23L, an error detector 24, demultiplexers 25L, 25R, decoders 26a to 26l, left route data selectors 27a to 27d and right route data selectors 28a to 28d.

The digital audio data of the respective channels are read from the digital sound tracks 5L and 5R of the motion picture film 1 by the CCD line sensors 20L, 20R for reproducing 8-channel audio signals.

The CCD line sensors 20L, 20R are connected via demodulators 21L, 21R to the error correction devices 22L, 22R, respectively. The error correction device 22L is connected to the delay memory 23L and the error detector 24. The delay memory 23L is connected to the demultiplexer 25L. The error detection device 22R is connected to the demultiplexer 25R and the error detector 24. The error detector 24 is connected to the data selectors 27a to 27d and to the data selector 28a to 28d.

The demultiplexer 25L is connected so that data will be fed therefrom to the decoders 26a to 26f, while the demultiplexer 25R is connected so that data will be fed therefrom to the decoders 26g to 26l.

The decoder 26a is connected to the data selector 27a, and the decoder 26b is connected to the data selector 27b. The decoder 26c is connected to the data selector 27c, and the decoder 26d is connected to the data selector 27d. The decoder 26e is connected to the data selector 28d. The decoder 26f is connected to the data selectors 28a, 28b and 28c. The decoder 26g is connected to the data selector 27a, and the decoder 26h is connected to the data selector 28a. The decoder 26i is connected to the data selector 28b, and the decoder 26j is connected to the data selector 28c. The decoder 26k is connected to the data selector 28d. The decoder 26l is connected to the data selectors 27b, 27c and 27d.

The digital audio data of the left and right channels, read out by the CCD line sensors 20L, 20R, are demodulated by the demodulators 21L, 21R, and fed to the error correction devices 22L, 22R, respectively.

The audio data are corrected for errors by the error correction circuits 22L, 22R, using the C1 parity data and C2 parity data, demodulated by the demodulators 21L, 21R, respectively.

Of the error-corrected data, output data of the error correction circuit 22L, that is left-route data, are fed to the delay memory 23L and corrected for time difference from the right route data for synchronization with the right-route data. The error-corrected data are also fed to the error detector 24.

The synchronized data are fed to the demultiplexers 25L, 25R so as to be decomposed into C-, L-, CL-, SL-, SW- and RM channels by the demultiplexer 25L and into C-, R-, CR-, SR-, SW- and LM channels by the demultiplexer 25R so as to be distributed to the decoders 26a to 26l.

The decoders 26a to 26l perform decoding which is a counterpart operation of high efficiency encoding for data compression of the recording apparatus described above.

The center-channel audio data Cn, decoded by the decoders 26a and 26g, is outputted via the data selector 27a. The left channel audio data Ln decoded by the decoder 26b is outputted via the data selector 27b. The center left channel audio data CLn decoded by the decoder 26c is outputted via the data selector 27c. The surround left channel audio data SLn decoded by the decoder 26d is outputted via the data selector 27d. The sub-woofer channel audio data SWn decoded by the decoders 26e and 26k is outputted via the data selector 28d. The right channel audio data Rn decoded by the decoder 26h is outputted via the data selector 28a. The center right channel audio data CRn decoded by the decoder 26i is outputted via the data selector 28b. The center right channel audio data CRn decoded by the decoder 26j is outputted via the data selector 28c.

The right route compensation data RMn, decoded by the decoder 26f, is supplied to the data selectors 28a, 28b and 28c. The left-route compensation data LMn, decoded by the decoder 26l, is supplied to the data selectors 27b, 27c and 27d.

The error detector 24 monitors error flags of the audio data Cn, SWn, Ln, Rn, CLn, CRn, SLn, SRn, LMn and RMn, supplied from the error correction devices 22L, 22R, and controls the data selectors 27a to 27d and data selectors 28a to 28d of the respective channels in the following manner.

That is, the error detector 24 controls the data selectors 27a to 27d and the data selectors 28a to 28d to output regular decoded data that is audio data Cn, SWn, Ln, Rn, CLn, CRn, SLn and SRn of the respective channels, decoded by the decoders 26a to 26e and the decoders 26g to 26k, unless there is any error in the audio data Cn, SWn, Ln, Rn, CLn, CRn, SLn, SRn, LMn and RMn of the respective channels supplied to the decoders 26a to 26l. There are available two center channel audio data Cn, that is the center channel audio data from the decoder 26a and the center channel audio data from the decoder 26g. It does not matter which of these two data are selected. Similarly, there are available two sub-woofer channel audio data SWn, that is the audio data from the decoder 26e and the audio data from the decoder 26k. It does not matter which of these two data are selected.

If, among the audio data Cn, SWn, Ln, Rn, CLn, CRn, SLn and SRn of the respective channels, decoded by the decoders 26a to 26l, there is any audio data which is found to be replete with errors and hence undecodable, the data selectors are controlled to select counterpart audio data. For example, if the audio data Ln from the decoder 26b cannot be decoded, the data selectors are controlled to select the audio data from the decoder 26l, that is the audio data LMn mixed from the audio data Ln, CLn and SLn. If, with the above-described reproducing apparatus according to the present invention, an extremely long burst error is produced in one of the digital sound tracks, such as the digital sound track 5L, and if there is any error in the opposite side digital sound track 5R, the left-channel audio data, that is the audio data mixed from the audio data Ln, CLn and SLn, can be reproduced, so that left-route signals may be generated from the audio data LMn.

If, for example, scratches are made by hand-cut editing on the film in the horizontal direction, as shown in FIG. 5, such that the frames $Cn+\alpha$, $Ln+\alpha$, $CLn+\alpha$, $SLn+\alpha$, $SWn+\alpha$, and $RMn+\alpha$ on the left route become unreproductable, while the frames Cn, Rn, CRn, SRn, SWn and LMn on the right route become unreproducable, the data at the position n of the time sequence of the left route is already reproduced by the left route, so that sound field reproduction is possible at the position n in the time sequence. On the other hand, sound field reproduction for data at the position $(n+\alpha)$ in the time sequence may be made at the position $(n+\alpha)$ in the time sequence by the data recorded in the right route.

By such dual recording of audio data of presumably crucial channels, the audio data is reproducible if the recording operation by one of the decoders is not possible but the decoding operation by another of the decoders is possible. As a result, sound field without sound interruption can be reproduced more effectively.

Figure 6:
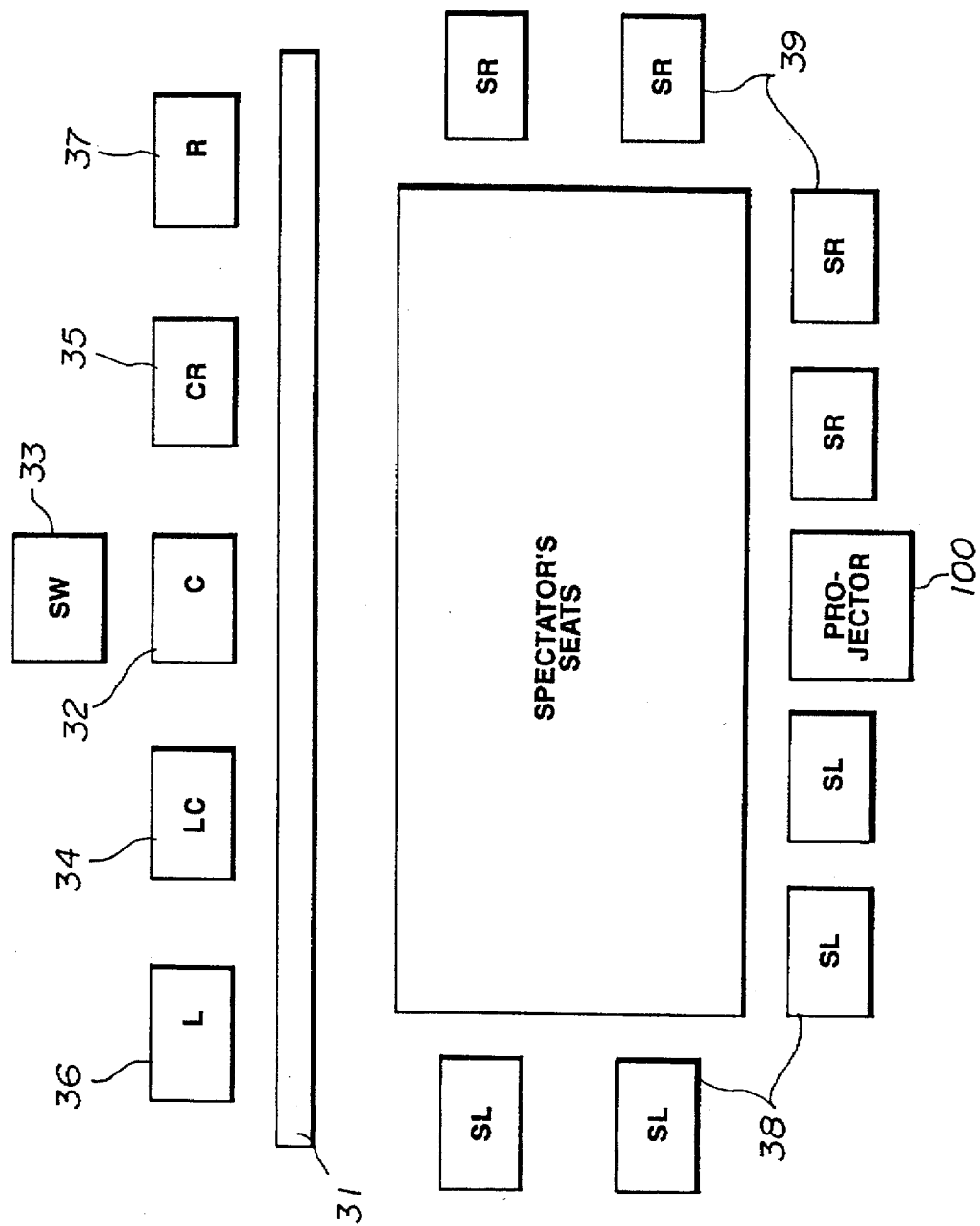
FIG. 6 shows the relative disposition between the speaker and the playback sound normally reproduced by the reproducing apparatus for a motion picture film according to the present invention.

As seen in FIG. 6, the 8-channel audio data reproduced by the present reproducing apparatus comprises six-channel audio data from a center speaker 32, a sub-woofer 33, a center left speaker 34, a center right speaker 35, a left speaker 36 and a right speaker 37, arranged on the side of a screen 31 on which a picture reproduced from the picture recording area 2 (FIG. 1) of the motion picture film 1 (FIG. 1) is projected by a projector 100, and two-channel audio data from a surround right speaker 39 and a surround left speaker 38, arranged on the side of the projector 100, as shown for example in FIG. 6. The sound field rich in ambience may be reproduced by the eight-channel digital sound system made up of the speakers 32 to 39.

The center speaker 32 is arranged at a center position on the side of the screen 31 and outputs the playback sound by the audio data C of the center channel. Thus it outputs the crucial playback sound, such as the actors' or actresses' dialogues. The sub-woofer 33 outputs the playback sound by the audio data SW of the sub-woofer channel. Thus it outputs the sound perceived as vibrations, rather than the low-range sound, such as the sound of an explosion, so that it is used frequently in explosion scenes in order to provide outstanding effects.

The left speaker 36 and the right speaker 37 are arranged on the left and right sides of the screen 31, respectively, and output the playback sound by the left-channel audio data L and the playback sound by the right-channel audio data R, while displaying stereophonic effects.

The center left speaker 34 and the center right speaker 35 are respectively arranged between the center speaker 32 and the left speaker 36 and between the center speaker 32 and the right speaker 37 and output the playback sound by the center left channel audio data CL and the playback sound by the center right channel audio data CR; thus assisting the left speaker 36 and the right speaker 37. These speakers are important, because in a motion picture theater which has a large-format screen and which is capable of holding a large number of guests, the fixed position feeling of the sound image becomes unstable depending on the seat position. Addition of the center left speaker 34 and the center right speaker 35 is effective in creating a more realistic fixed-position feeling of the sound image.

The surround left speaker 38 and the surround right speaker 39 are arranged surrounding the spectator's seats in order to output the playback sound by the audio data SL of the surround left channel and the playback sound by the audio data SR of the surround right channel, thereby giving the spectator the impression of being encircled by the reverberating sound or jubilee. This creates a more stereophonic sound image.

Figure 7:
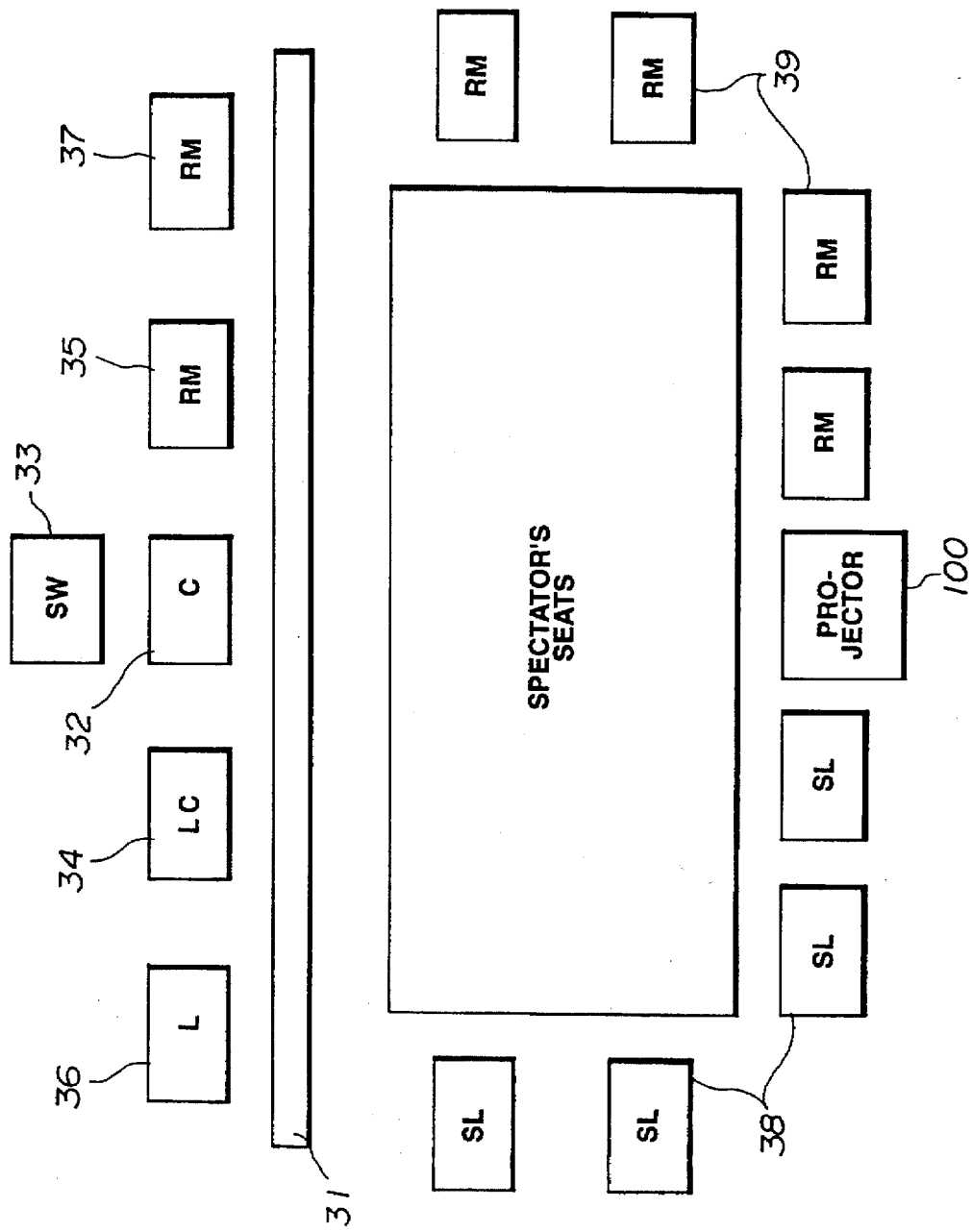
FIG. 7 shows the relative disposition between the speaker and the playback sound in which only one of the sound tracks is reproduced by the reproducing apparatus for a motion picture film according to the present invention.

If only audio data of the left digital sound track, for example, is reproduced, as shown in FIG. 7, the center right speaker 35, right speaker 37 and the surround right speaker 39 output the playback sound which is mixed audio data RM of the center right channel (CR), right channel (R) and the surround right channel (SR), so that, if the sound of the right route in its entirety becomes unreproducable, the sound effect similar to that during the usual operation may be realized without sound interruption.

Figure 8:
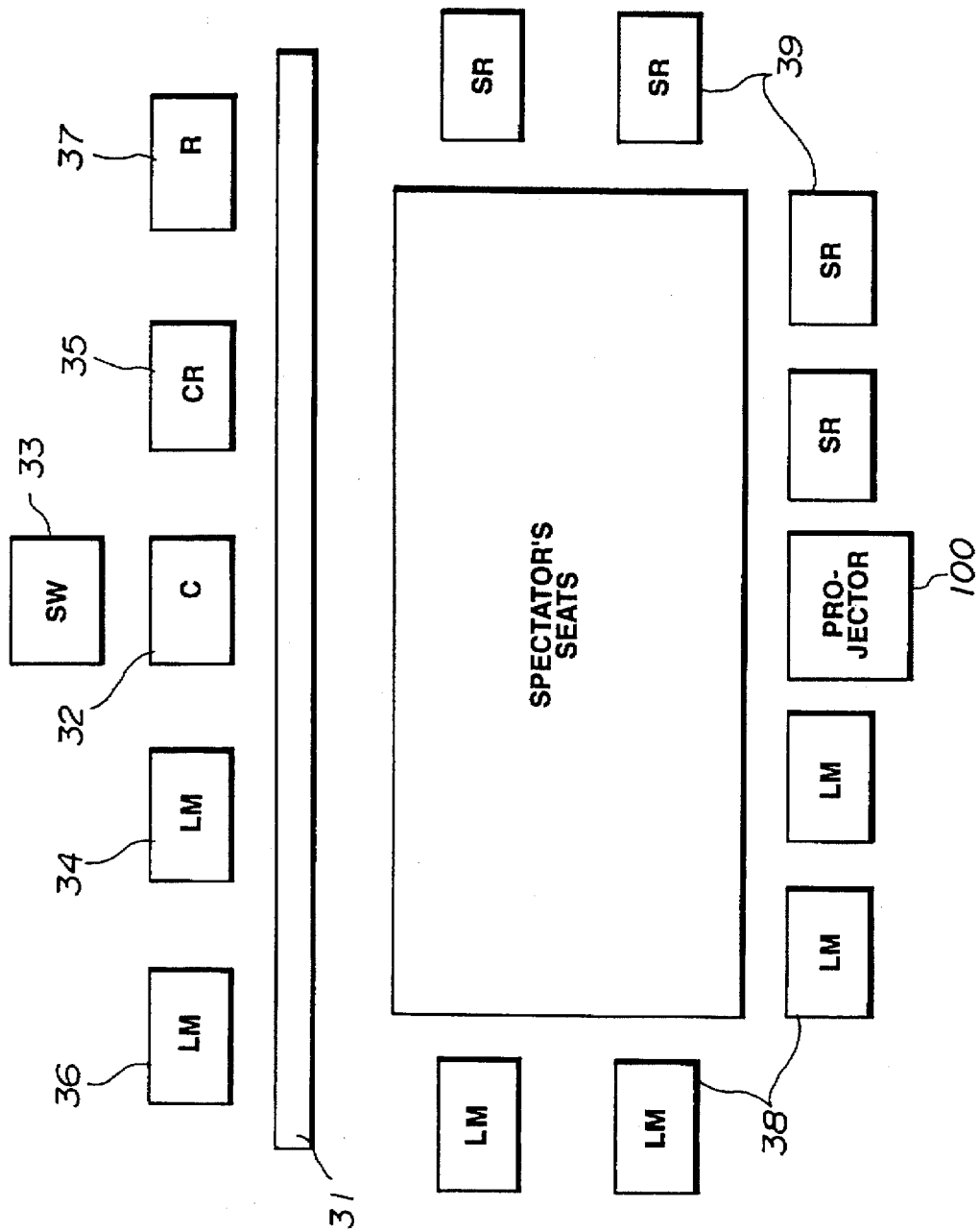
FIG. 8 shows the relative disposition between the speaker and the playback sound in which only the other of the sound tracks is reproduced by the reproducing apparatus for a motion picture film according to the present invention.

On the other hand, if only audio data of the right digital sound track, for example, is reproduced, as shown in FIG. 8, the center left speaker 34, left speaker 36 and the surround left speaker 38 output the playback sound which is mixed audio data RM of the center left channel (CL), left channel (L) and the surround left channel (SL), so that, if the sound of the left route in its entirety becomes unreproducable, the sound effect similar to that during the usual operation may be realized without sound interruption.

Figure 9:
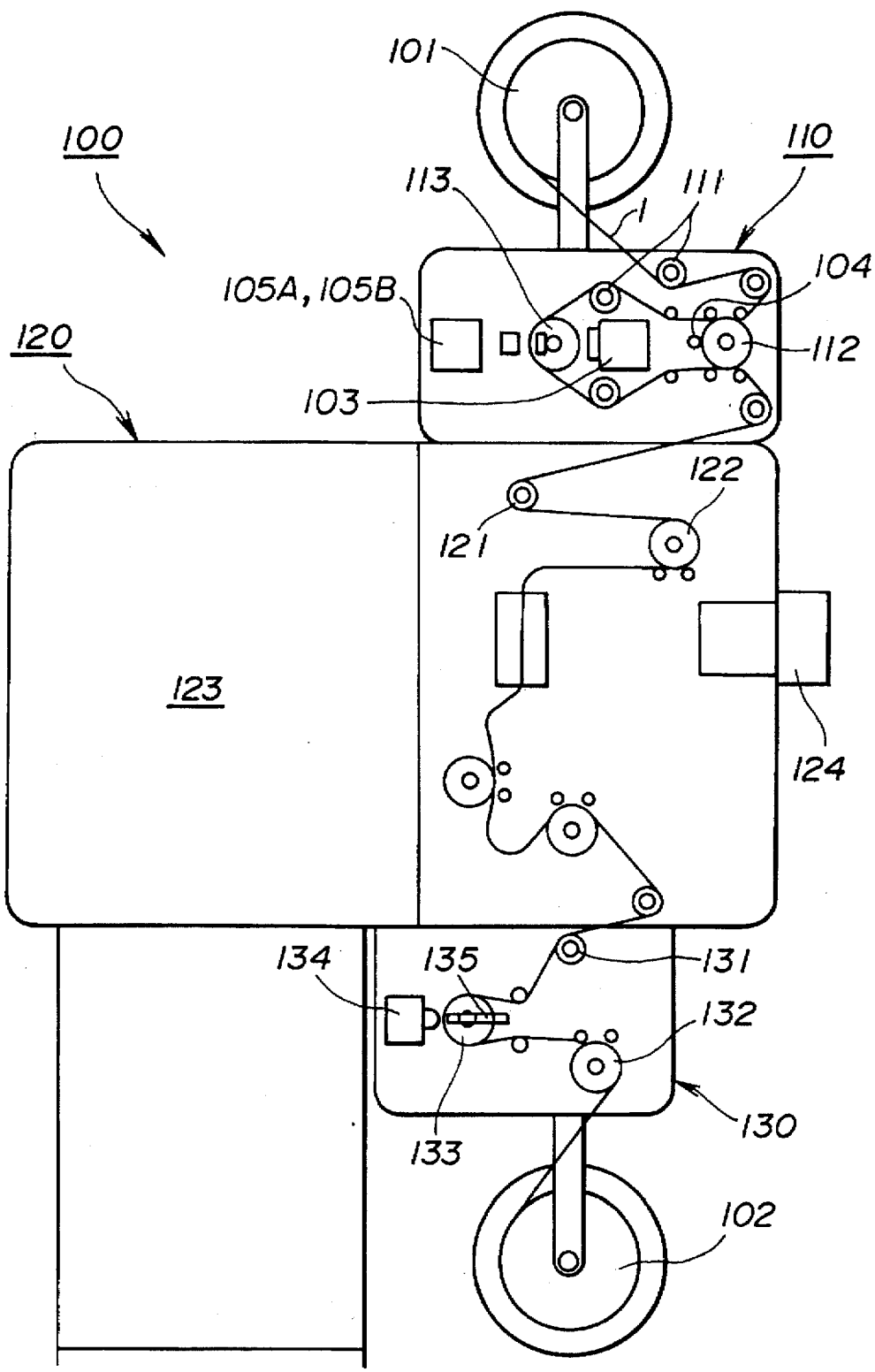
FIG. 9 illustrates a motion film projector used for showing a motion picture film according to the present invention.

The projector is arranged as shown in FIG. 9.

In a projector 100, the motion picture film 1 is reeled out from a supply reel 101 so as to be guided by guide rolls 111, 121, 131, sprockets 112, 122, 132 and guide drums 113, 133 etc., so as to be taken up by a take-up reel 102 via a digital audio reproducing unit 110, a projection unit 120 and an analog audio reproducing unit 130.

The digital audio reproducing unit 110 reads out the digital patterns of the digital sound track 5L and the digital sound track 5R of the motion picture film 1 in order to reproduce the audio signals. It is noted that the motion picture film 1 is run by being guided by the guide roll 111, sprocket 112 and the guide drum 113. When the motion picture film is running in contact with the guide drum 113, the readout light from a light source 103 is radiated on the digital sound track 5L (FIG. 1) and the digital sound track 5R (FIG. 1) so as to be received by CCD line sensors 105A, 105B in order to read out the digital patterns of the digital sound track 5L and the digital sound track 5R and in order to reproduce audio signals.

The digital audio reproducing unit 110 generates a detection signal of a frequency of 96 Hz, synchronized with the running speed of the motion picture film 1, by a photointerruptor 104, detecting passage of teeth of the sprocket 112 engaged with the perforations 3 of the motion picture film 1. This 96 Hz detection signal is fed to a playback clock generator of the playback processing system.

The playback clock generator generates 44.1 kHz playback clocks by its PLL, not shown. These 44.1 kHz playback clocks are synchronized with the 96 Hz detection signal produced by detecting the passage of teeth of the sprocket 112 engaged with the perforations 3L (FIG. 1) and the perforations 3R (FIG. 1) of the motion picture film 1 by the photointerruptor 104.

The digital audio reproducing unit 110 demodulates, from the dot pattern data obtained on reading the digital patterns of the digital sound track 5L (FIG. 1) and the digital sound track 5R (FIG. 1) by the CCD line sensors 105A, 105B, the compressed audio data of respective channels by each demodulating circuit operating responsive to playback clocks fed from the playback clock generator, and performs error correction on the audio data in each error correction circuit in order to regenerate the compressed audio data of the respective channels on the memory. A data expansion circuit, operating responsive to the playback clocks supplied from the playback clock generator, expands the compressed audio data for reproducing the audio data of the respective channels.

The projection unit 120 of the projector projects the picture of the motion picture film 1 on a screen, not shown. The light of projection from a projection light source 123 is radiated on the picture recording areas 2 of the motion picture film 1, which is run by being guided by the guide roll 121 and the sprocket 122, so that the projection light is radiated via a projection lens 124.

The analog audio signal reproducing unit 130 reproduces analog audio signals from the analog audio track 4L and the analog audio track 4R of the motion picture film 1. It is noted that the motion picture film 1 is run by being guided by the guide roll 131, sprocket 132 and the guide drum 133. The analog audio signal reproducing unit 130 illuminates the readout light from a light source 134 to the analog sound track 4 of the motion picture film 1 as it traverses the guide drum 133. This readout light is received by a light sensor 135 for reproducing analog audio signals from the analog sound track 4.

Figure 10:
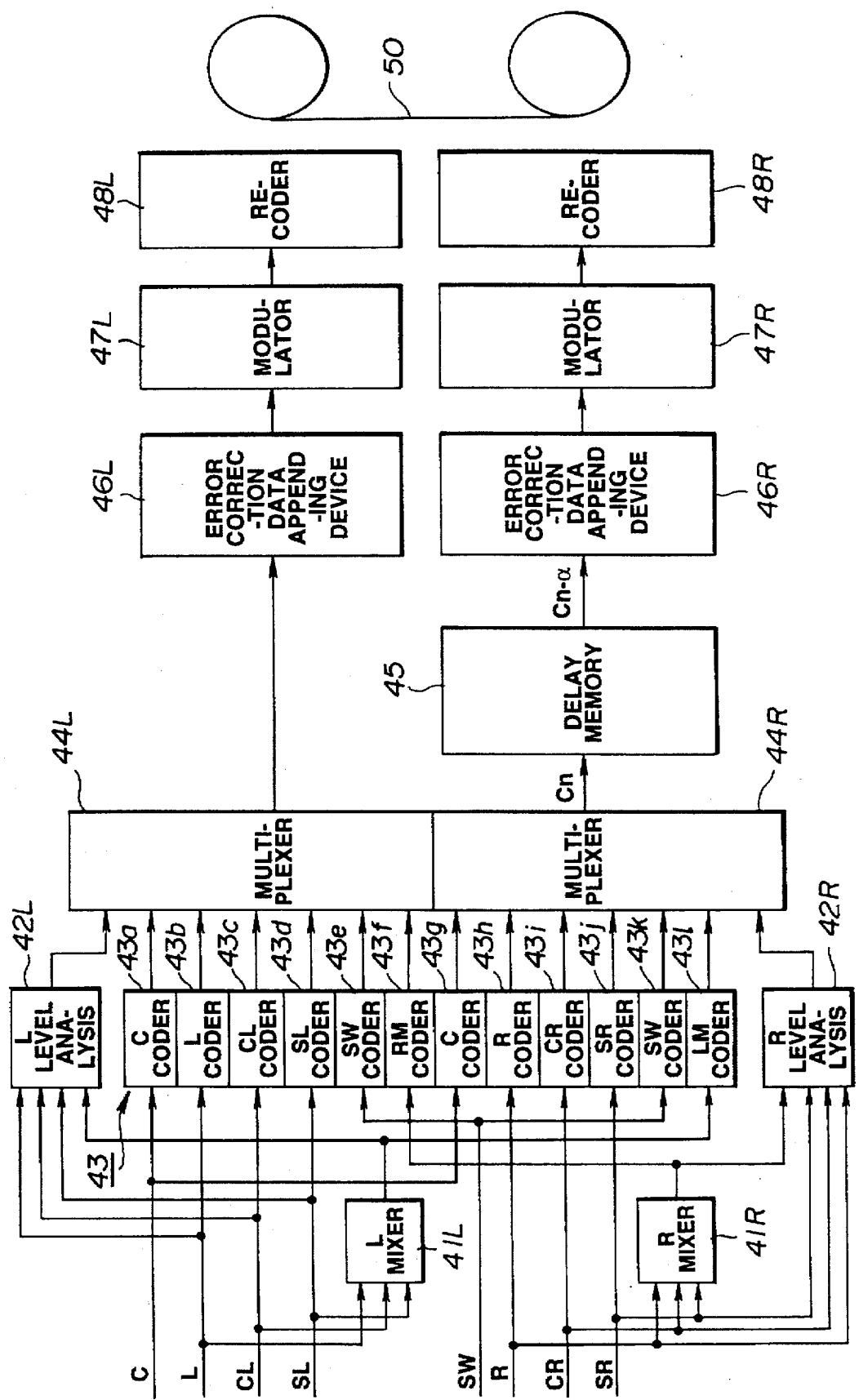
FIG. 10 is a block diagram showing an alternative embodiment of a recording apparatus for a motion picture film according to the present invention.

An alternate embodiment of the recording apparatus for a motion picture film according to the present invention is configured as shown for example in FIG. 10.

The recording apparatus for a motion picture film according to the embodiment of the invention shown in FIG. 10 is made up of mixers 41L, 41R, level analyzers 42L, 42R, coders 43a to 43l, multiplexers 44L, 44R, a delay memory 45, error correction data appending devices 46L, 46R, modulators 47L, 47R and recorders 48L, 48R.

The present recording apparatus for a motion picture film has, as inputs, audio data of eight channels, namely a center channel (C), a left channel (L), a surround left channel (SL), a right channel (R), a center right channel (CR), a surround right channel (SR) and a sub-woofer channel (SW). The center channel (C) is connected to the coders 43a and 43g, and the left channel (L) is connected to the mixer 41L, level analyzer 42L and the coder 43b. The center left channel (CL) is connected to the mixer 41L, a level analyzer 42L and the coder 43c and the mixer 11L, and the surround left channel (SL) is connected to the mixer 41L, a level analyzer 42L and a coder 43l. The mixer 41L has its output connected to the level analyzer 42L and the coder 43d is connected to the coder 12g. The right channel (R) is connected to the mixer 41R, a level analyzer 42R and a coder 43h, and the center right channel (CR) is connected to the mixer 41R, level analyzer 42R and the coder 43i. The surround right channel (SR) is connected to the mixer 41R, level analyzer 42R and the coder 43j. The mixer 41R has its output connected to the level analyzer 42R and the coder 43f. The sub-woofer channel (SW) is connected to the coders 43e and 43k.

The coders 43a to 43f and the level analyzer 42R are connected to the multiplexer 44L, and the coders 43g to 43l and the level analyzer 42L are connected to the multiplexer 44R. The multiplexer 44L is connected via the error appending device 46L and the modulator 47L to the recorder 48L. On the other hand, the multiplexer 44R is connected via the delay memory 45R to the error correction data appending device 46R and thence to the recorder 48R via the modulator 47R.

Input audio signals to the center channel (C) are fed to the coders 43a and 43g. input digital audio signals to the left channel (L) are fed to the mixer 41L, level analyzer 42L and the coder 43b, and input digital audio signals to the center left channel (CL) are fed to the mixer 41L, level analyzer 42L and the coder 43c. Input digital audio signals to the surround left channel (SL) are fed to the mixer 41L, level analyzer 42L and the coder 43d, while the signals fed to the mixer 41L are mixed together as a mixed signal LM which is fed to the level analyzer 42L and the coder 43l as left-route compensation data made up of a mixed signal LM.

Input audio signals to the right channel (R) are fed to the mixer 41R, level analyzer 42R and the coder 43h. Input digital audio signals to the center right channel (CR) are fed to the mixer 41L, level analyzer 42R and the coder 43i. Input digital audio signals to the surround right channel (SR) are fed to the mixer 41R, level analyzer 42R and the coder 43j, while the signals fed to the mixer 41R are mixed together as a mixed signal RM which is in turn fed to the level analyzer 42R and the coder 43f as right-route compensation data made up of a mixed signal RM.

Input digital audio signals to the sub-woofer channel (SW) are fed to the coders 43e and 43k.

The digital audio signals C, L, CL, SL, SW and RM, fed to the coders 43a to 43f, are coded, as left-route signals, by compressing the data volume by one-fifth by high compression coding consisting in the combination of sub-band coding, orthogonal transform coding or bit allocation. The digital audio signals C, R, CR, SR, SW and LM, fed to the coders 43g to 43l, are coded, as right-route signals, by compressing the data volume by one-fifth by high compression coding consisting in the combination of sub-band coding, orthogonal transform coding or bit allocation.

The level analyzer 42L analyzes the level ratio between the signal LM mixed by the mixer 41L, that is left-route compensation data, and the digital audio signals L, CL and SL of the original channels, and generates level ratio data indicating the level ratio. The level ratio data generated by the level analyzer 42L is fed to the multiplexer 44L. On the other hand, the level analyzer 42R analyzes the level ratio between the signal RM mixed by the mixer 41R, that is right-route compensation data, and the digital audio signals R, CR and SR of the original channels, and generates level ratio data indicating the level ratio. The level ratio data generated by the level analyzer 42R is fed to the multiplexer 44R.

The left-route signals coded by the coders 43a to 43f are combined into a recording bitstream by the multiplexer 44L along with the level ratio data generated by the level analyzer 42L. On the other hand, the right-route signals coded by the coders 43g to 43l are combined into a recording bitstream by the multiplexer 44R along with the level ratio data generated by the level analyzer 42R.

The left route output bitstream from the multiplexer 44L is fed to the error correction data appending device 46L, while the right route output bitstream from the multiplexer 44R is fed to the delay memory 45R. Time difference is appended by the delay memory 45R to the right route bitstream so that the right route bitstream will be recorded with a time lag with respect to the left route bitstream. The right route bitstream is then fed to the error correction data appending device 46R.

The data fed to the error correction data appending devices 46L, 46R are respectively added to by C2 parity error correction signals and C1 parity error correction signals, each employing the cross-interleave Reed-Solomon code, and thence fed to the modulators 47L, 47R.

The data fed to the modulators 47L, 47R are converted by 8–9 conversion so that 1-byte data is converted into 9-dot pattern data, with a data volume consisting of a pre-set number of bytes as a block. The converted data are recorded block-by-block on the digital sound tracks of the motion picture film by the recorders 48L, 48R.

Figure 11:
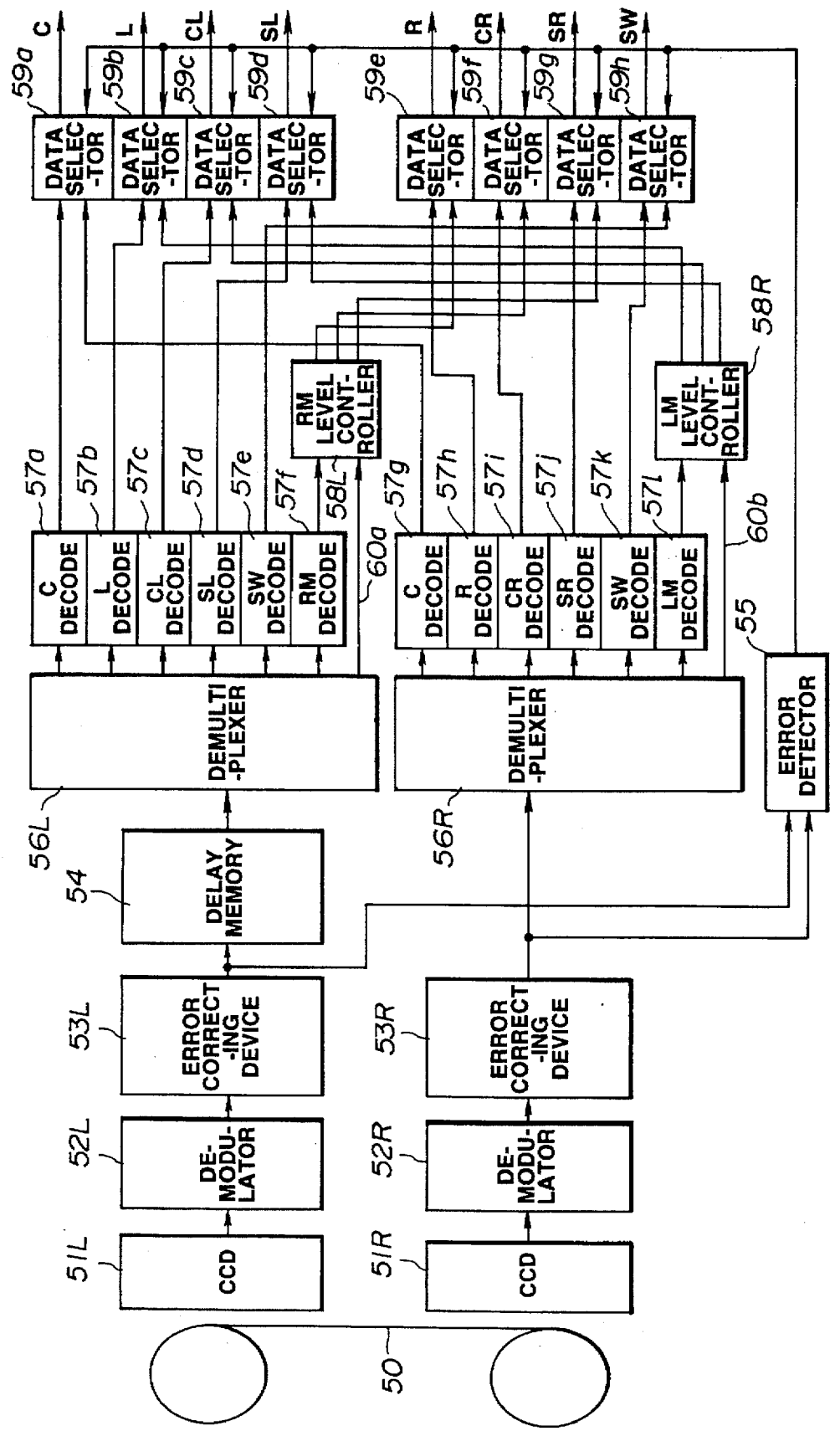
FIG. 11 is a block diagram showing an alternative embodiment of a reproducing apparatus for a motion picture film according to the present invention.

FIG. 11 shows an alternate embodiment of a reproducing apparatus for a motion picture film 50 of the present invention.

The motion picture film reproducing apparatus of the present embodiment, shown in FIG. 11, is made up of CCD line sensors 51L, 51R, demodulators 52L, 52R, error correction devices 53L, 53R, a delay memory 54, an error detector 55, demultiplexers 56L, 56R, decoders 57a to 57l, left controllers 58L, 58R, left route data selectors 58a to 58d and right route data selectors 59e to 59h. With the present reproducing apparatus, the digital audio data of the left and right channels of the motion picture film 50 are read from the digital sound tracks of the left and right channels of the motion picture film 1 by the CCD line sensors 51L, 51R for reproducing 8-channel audio signals.

The CCD line sensors 51L, 51R are connected via demodulators 52L, 52R to the error correction devices 53L, 53R, respectively. The error correction device 53L is connected to the delay memory 54 and the error detector 55. The delay memory 54 is connected to the demultiplexer 56L. The error detection device 53R is connected to the demultiplexer 56R and the error detector 55. The error correction device 55 is connected to the demultiplexer 56R and the error detector 55, which in turn is connected to the data selectors 59a to 59h.

The demultiplexer 56L is connected so that data will be fed therefrom to the decoders 57a to 57f, while the demultiplexer 56R is connected so that data will be fed therefrom to the decoders 57g to 57l.

The decoder 57a is connected to the data selector 59a, and the decoder 57b is connected to the data selector 59b. The decoder 57c is connected to the data selector 59c, and the decoder 57d is connected to the data selector 59d. The decoder 57e is connected to the data selector 59h. The decoder 57f is connected to the data selectors 59e, 59f and 59g via a level controller 58L. The decoder 57g is connected to the data selector 59a, and the decoder 57h is connected to data selector 59e. The decoder 57i is connected to the data selector 59f, and the decoder 57j is connected to the data selector 59g. The decoder 57k is connected to the data selector 59h, and the decoder 57l is connected via a level controller 58R to the data selectors 59b, 59c, 59d.

With the above-described reproducing apparatus, the left-route and right-route digital audio data, read out by the CCD line sensors 51L, 51R, are demodulated by the decoders 52L, 52R, so as to be supplied to the error correcting devices 53L, 53R, respectively. The audio data are corrected by the error correction devices 53L, 53R, using the C1 parity data and the C2 parity data demodulated by the demodulators 52L, 52R, respectively.

Output data from the error correction circuit 53L which are left-route data, are fed to the delay memory 54 in order to correct the time difference between the left and right routes; that is, in order to synchronize the left route with the right route. The error flags of the respective error-corrected data are fed to the error detector 55.

The synchronized left-route and right-route data are supplied to the demultiplexer 56L and 56R, respectively. The left-route data are decomposed by the demultiplexer 56L into C, L, CL, SL, SW and RM audio data and the level ratio data 60a. Of these, the C, L, CL, SL, SW and RM audio data are distributed to the decoders 57a to 57f and the level ratio data 60a are fed to the level controller 58L. On the other hand, the right-route data are decomposed by the demultiplexer 56R into C, R, CR, SR, SW and LM audio data and the level ratio data 60b. Of these, the C, R, CR, SR, SW and LM audio data are distributed to the decoders 57g to 57l and the level ratio data 60b are fed to the level controller 58L. The decoders 57a to 57l perform decoding which is the counterpart operation of high efficiency coding for data compression in each of the recording apparatus.

The center channel audio data Cn, decoded by the decoders 57a and 57g, are outputted via the data selector 59a. The left channel audio data Ln, decoded by the decoder 57b, are outputted via the data selector 59b. The left channel left audio data Cln, decoded by the decoder 57c, are outputted via the data selector 59c. The surround left channel left audio data SLn, decoded by the decoder 57d, are outputted via the data selector 59d. The sub-woofer channel audio data SWn, are decoded by the decoders 57e and 57k, are outputted via the data selector 59h. The right channel left audio data Rn, decoded by the decoder 57h, are outputted via the data selector 59e. The center right channel audio data CRn, decoded by the decoder 57i, are outputted via the data selector 59f. The center right channel audio data CRn, decoded by the decoder 57j, are outputted via the data selector 59g.

The right channel audio data RMn, decoded by the decoder 57f, is level-controlled by the level controller 58L, based upon the level ratio data from the demultiplexer 56L, so as to be supplied to the data selectors 59e, 59f and 59g. On the other hand, the right channel audio data RMn, decoded by the decoder 57l, is level-controlled by the level controller 58R, based upon the level ratio data from the demultiplexer 56R, so as to be supplied to the data selectors 59b, 59c and 59d.

The error detector 55 monitors error flags of the audio data Cn, SWn, Ln, Rn, CLn, CRn, SLn, SRn, LMn and RMn, supplied from the error correction devices 53L, 53R, and controls the data selectors 59a to 59d and the data selectors 59e to 59h of the respective channels in the following manner.

That is, the error detector 55 controls the data selectors 59a to 59d and the data selectors 59e to 59h to output regular decoded data that is audio data Cn, SWn, Ln, Rn, CLn, CRn, SLn and SRn of the respective channels, decoded by the decoders 57a to 57f and the decoders 57g to 57k, unless there is any error in the audio data Cn, SWn, Ln, Rn, CLn, CRn, SLn, SRn, LMn and RMn of the respective channels supplied to the decoders 57a to 57l. There are available two center channel audio data Cn, that is the center channel audio data from the decoder 57a and the center channel audio data from the decoder 57g. It does not matter which of these two data is selected. Similarly, there are available two sub-woofer channel audio data SWn, that is the audio data from the decoder 57e and the audio data from the decoder 57k. It does not matter which of these two data is selected.

If, among the audio data Cn, SWn, Ln, Rn, CLn, CRn, SLn and SRn of the respective channels, decoded by the decoders 57a to 57l, there is any audio data which is found to be replete with errors and hence undecodable, the data selectors are controlled to select counterpart audio data. For example, if the audio data Ln from the decoder 57b cannot be decoded, the data selectors are controlled to select the audio data LMn from the decoder 57l, that is the audio data LMn level-controlled based on the level ratio data.

That is, by level-controlling the audio data LMn, RMn, based upon the level ratio data in the level controllers 58L, 58R, which are responsive to the respective channels, the level difference from the inherent data of the respective channels is eliminated, so that extremely spontaneous acoustic output may be produced.

Furthermore, by encoding the level ratio data using a number equal to a whole number multiple of the number of samples used as an encoding unit in the compression coding in the recording system, e.g., 512, it becomes possible to achieve bitstream conversion of level ratio data at the input unit from the coders 43a to 43l (FIG. 10). On the other hand, in the demultiplexers 56L, 56R in the reproducing apparatus, it becomes possible to achieve bitstream conversion of level ratio data at the output of the decoders 57a to 57l, and hence to record data without exhibiting redundancy.

Figure 13:
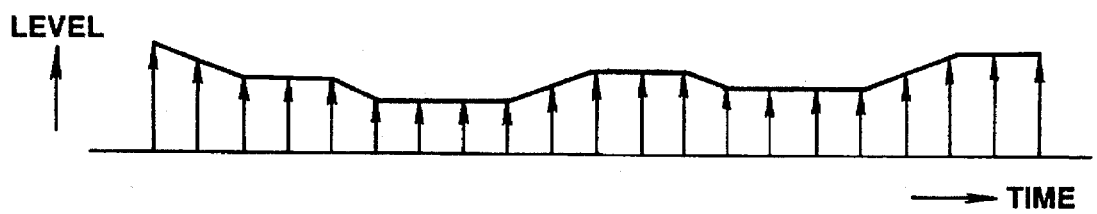
FIG. 13 illustrates another operation of the level controller in the reproducing apparatus shown in FIG. 11.
Figure 14:
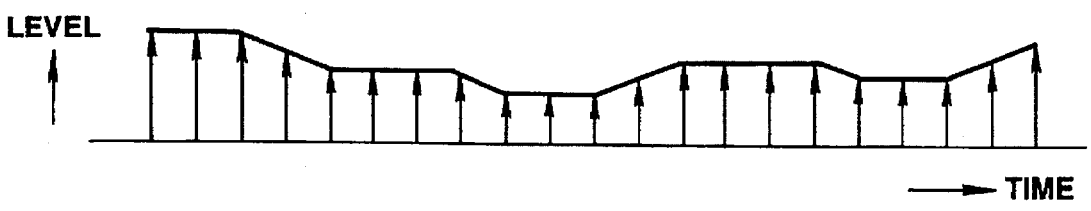
FIG. 14 illustrates still another operation of the level controller in the reproducing apparatus shown in FIG. 11.

In such case, the level controllers 58L, 58R of the reproducing apparatus perform sample-by-sample speech level control in order to avoid data discontinuity at each boundary between level ratio data coding samples. For example, a level change is divided into a plurality of steps as shown for example in FIG. 12, or caused to occur at an interval of several decibels as shown in FIGS. 13 or 14.

Figure 12:
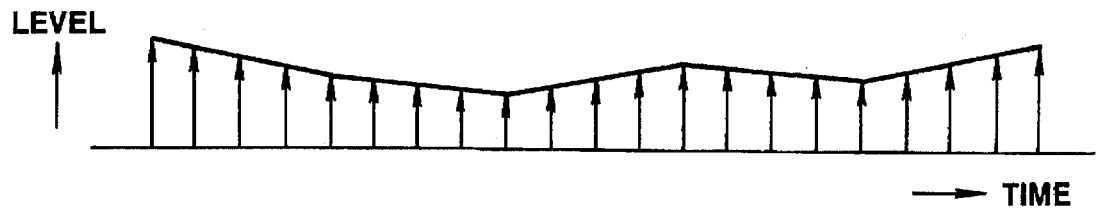
FIG. 12 illustrates an operation of a level controller in the reproducing apparatus shown in FIG. 11.

That is, in the embodiment shown in FIG. 12, acute level changes are prevented by changing the level by taking advantage of the coding sample unit length of the level ratio data in its entirety. In the embodiment shown in FIG. 13, acute level changes are prevented by changing the level from the leading end of the sample, with the level change gradient remaining constant irrespective of the amount of the level change. In the embodiment shown in FIG. 14, acute level changes are prevented by changing the level at the trailing end of the sample, with the level change gradient remaining constant irrespective of the amount of the level change. In FIGS. 12 to 14, thick-lined arrows indicate the coded level ratio data, while the thin-lined arrows indicate the level data produced at the level controllers 58L, 58R.

In each of the above described embodiments, digital audio data of temporally same left channel and right channel audio signals are spatially recorded in the left channel and right channel digital sound tracks with a shift of a pre-set distance along the film running direction. However, similar effects may be achieved by spatially recording the temporally same analog data of the left and right channels in the left channel and right channel analog sound tracks.

Figure 15:
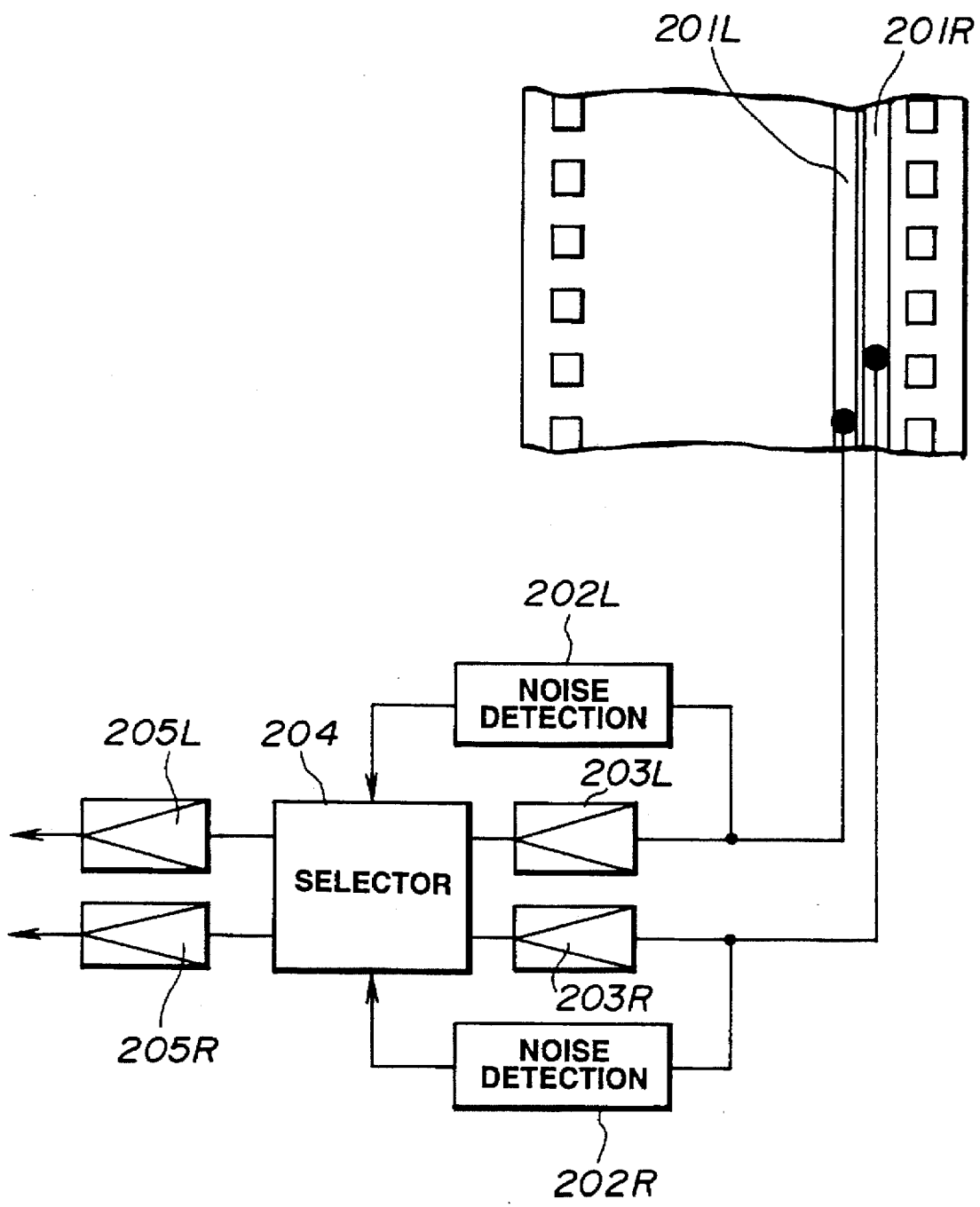
FIG. 15 is a block diagram showing another alternative embodiment of a reproducing apparatus for a motion picture film according to the present invention.
Figure 16:
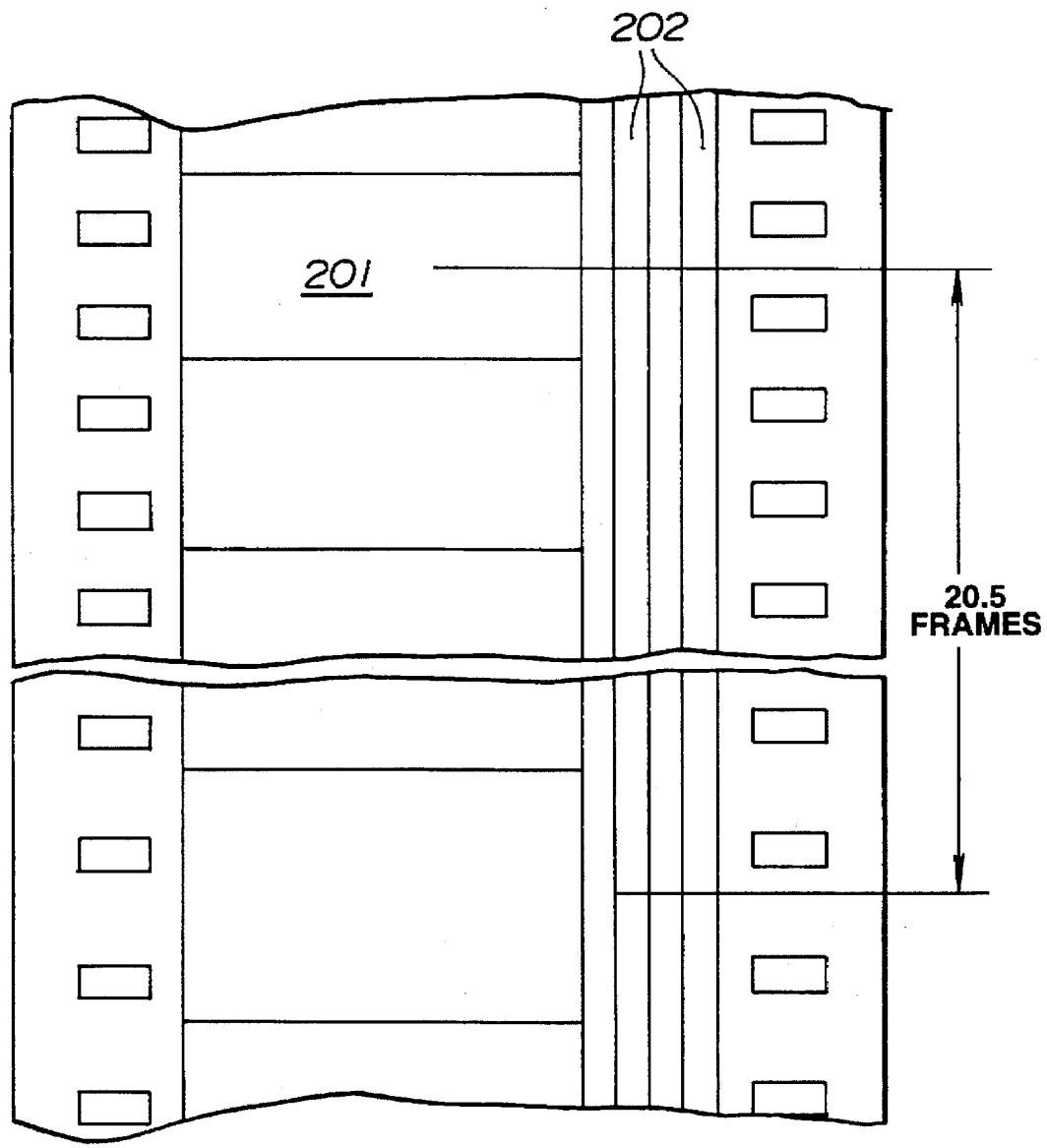
FIG. 16 shows a conventional motion picture film.

As seen further in FIG. 15, the left and right analog audio data from the left analog sound track 201L and the right analog sound track 201R, in which there are recorded left channel and right channel analog audio data, are supplied to a left noise detector 202L, a right noise detector 202R, a left amplifier 203L and a right amplifier 203R. The left noise detector 202L and the left noise detector 202R detect the noise of the left and right analog audio data supplied thereto, and supply the detected output to the switch 204 which in turn, controls the left analog audio data of the left amplifier 203L and the right analog audio data of the right amplifier 203R according to said detected output. More particularly, if no noise is detected in the left nor right analog audio data, the left analog audio data from the left amplifier 203L is outputted via an output left amplifier 205L while the right analog audio data from the right amplifier 203R is outputted via an output right amplifier 205R. If the noise is detected in one of the analog audio data, the switch 204 is changed over so that the other noise-free analog audio data is outputted via the output amplifiers 205L, 205R.

With the motion picture film of the present invention, the temporally same left and right channel audio signals are held on left-channel and right-channel sound tracks with a spatial shift of a pre-set distance along the film running direction. Thus it becomes possible to compensate for sound interruption caused by simultaneous destruction of the audio data of the left and right channels by scratches extending normal to the film running direction or at the film junction in the reproducing system, and hence to prevent loss of the reproducability of the reproducing system to enable positive reproduction of audio data. Also it becomes possible to compensate for sound interruption even if the recording area of audio data of one of the channels is destroyed by a long burst error and becomes unreproducable.

While specific embodiments of the invention have been shown and disclosed, it is to be understood that numerous changes and modifications may be made by those skilled in the art without departing from the scope and intent of the invention.

What is claimed is:

1. A method of reproducing audio signals from a motion picture film having at least left-channel and right-channel digital sound tracks extending along a film running direction, wherein left channel and right-channel audio data are recorded respectively on the left-channel and right-channel sound tracks with a spatial shift relative to each other along the film running direction, comprising the steps of:

reading temporally same left-channel and right-channel audio signals from the left-channel and right-channel sound tracks, wherein said left-channel and right-channel audio signal comprise different audio signals;

detecting dropout of audio signals of one of the temporally same left-channel and right-channel audio signals reproduced by said reading step; and replacing the temporally same audio signals of the channel suffering from dropout with the temporally same audio signals of the other soundtrack based on detection by said dropout detection step.

2. An apparatus for reproducing audio signals from a motion picture film having at least left-channel and right-channel digital sound tracks extending along a film running direction, wherein left-channel and right-channel audio data recorded on the left-channel and right-channel sound tracks with a spatial shift relative to each other with a pre-set distance along the film running direction, comprising:

means for reproducing temporally same left-channel and right-channel audio signals from the left-channel and right-channel sound tracks, wherein said left-channel and right-channel audio signals comprise different audio signals;

dropout detection means for detecting dropout of the audio signals of one of the temporally same left-channel and right-channel audio signals reproduced by said reproducing means; and signal changeover means for replacing the temporally same audio signals of the channel suffering from dropout by the temporally same audio signals of the other channel based on a detection output by said dropout detection means.

3. An apparatus for playback of motion picture film, comprising in combination:

first reading means for reading a first digitally encoded audio signal;

second reading means for reading a second digitally encoded audio signal, said second digitally encoded audio signal being separated from said first digitally encoded audio signal by a predetermined distance along a direction of film travel;

means for delaying said first digitally encoded audio signal by a predetermined amount of time so that said first and second digitally encoded audio signals are available at a coincident time;

an error detector for determining if either of said first or second digitally encoded audio signals includes an unacceptable number of errors; and a data selector, responsive to said error detector, for selecting data from one of said first or second digitally encoded audio signals if the other of said first or second digitally encoded audio signals includes an unacceptable number of errors wherein said first and second digitally encoded audio signals respectively include first and second compensation data.

4. The apparatus of claim 3, further comprising level controller means for reproducing first and second level ratio data, said first level ratio data indicating the level ratio between said first compensation data and said first digitally encoded audio signals and said second level ratio data indicating the level ratio between said second compensation data and said second digitally encoded audio signals, respectively, and wherein the level of portions of said first and second digitally encoded audio signals are respectively controlled depending on the first and second level ratio data.

5. The apparatus of claim 3, wherein said first and second reading means include charge-coupled devices physically separated by said predetermined distance.

6. The apparatus of claim 3, further comprising an error-correcting device for correcting errors in said first and second digitally encoded audio signals.

7. The apparatus of claim 6, wherein said unacceptable number of errors is a number greater than a number which can be corrected by said error correcting device.

8. A method for playback of motion picture film, comprising the steps of:

reading a first digitally encoded audio signal;

reading a second digitally encoded audio signal, said second digitally encoded audio signal being spatially separated from said first digitally encoded audio signal by a predetermined distance along a direction of film travel;

delaying said first digitally encoded audio signal by a predetermined amount of time so that said first and said second digitally encoded audio signals are available at a coincident time;

determining if either of said first or second digitally encoded audio signals includes a predetermined number of errors; and selecting data from one of said first or second digitally encoded audio signals if the other includes at least said predetermined number of errors, wherein said first and second digitally encoded audio signals respectively include first and second compensation data.

9. A method of reproducing audio from a damaged motion picture film, comprising the steps of:

providing a motion picture film having a first digital sound track extending along a direction of film travel, a second digital sound track extending along said direction of film travel, said first digital sound track including blocks of data representing at least a first stereo channel and a first mixture of channels including a second stereo channel, said second digital sound track including blocks of data representing at least said second stereo channel and a second mixture of channels including said first stereo channel, wherein the blocks of data of temporally same left and right stereo channels respectively are recorded with a spatial shift of a predetermined distance along a direction of film travel;

detecting damaged data in said first digital sound track; and substituting said second mixture of channels for said first stereo channel for reproduction upon detection of said damaged data.

10. A method of reproducing audio from a motion picture film, comprising the steps of:

reading a first digital audio track containing a first stereo channel;

reading a second digital audio track containing a second stereo channel and a compensation channel;

substituting said compensation channel for said first stereo channel in the event an uncorrectable error is detected in said first digital audio track; and, converting said compensation and said second stereo channel respectively to audio signals played back as a representation of said first and second stereo channels.

11. The method of claim 10, wherein said compensation channel includes said first stereo channel mixed with at least one of its associated ambience channels.

12. A method of reproducing digitally encoded audio signals from a motion picture film, comprising the steps of:

reading out a first digitally encoded audio signal through a first reading means;

reading out a second digitally encoded audio signal through a second reading means, wherein said second digitally encoded audio signal includes temporally same information as said first encoded audio signal recorded on said motion picture film with a spatial shift of a predetermined distance along said film running direction;

delaying through delay means said first digitally encoded audio signal by a predetermined amount of time, in order that said first and second digitally encoded audio signals are available at a coincident time;

detecting, through an error detector, whether an uncorrectable number of errors is included in either of said first or second digitally encoded audio signals;

decoding said first and second digitally encoded audio signals through decoding means in order to provide first and second decoded audio signals; and selecting data from either of said first or second decoded audio signals through data selecting means if the other of said first or second decoded audio signals includes said uncorrectable number of error.

13. The method of claim 12, wherein said first and second digitally encoded audio signals respectively include first and second compensation data, and further comprising the step of:

controlling through level controller means, portions of said first and second decoded signals respectively based on the level ratios of said first and second decoded audio signals, wherein said level ratios of said first and second decoded audio signals respectively indicate the level between said first compensation data and said first decoded signal and the level between said second compensation data and said second decoded signal.

* * * * *